Nov. 27, 1934.  S. D. CLITHERO ET AL  1,982,045
GAS TANK PRESSURE REGULATOR
Filed Nov. 2, 1931  2 Sheets-Sheet 1

STANLEY D. CLITHERO
EUGENE G. DURANDO
*INVENTORS*

*ATTORNEY*

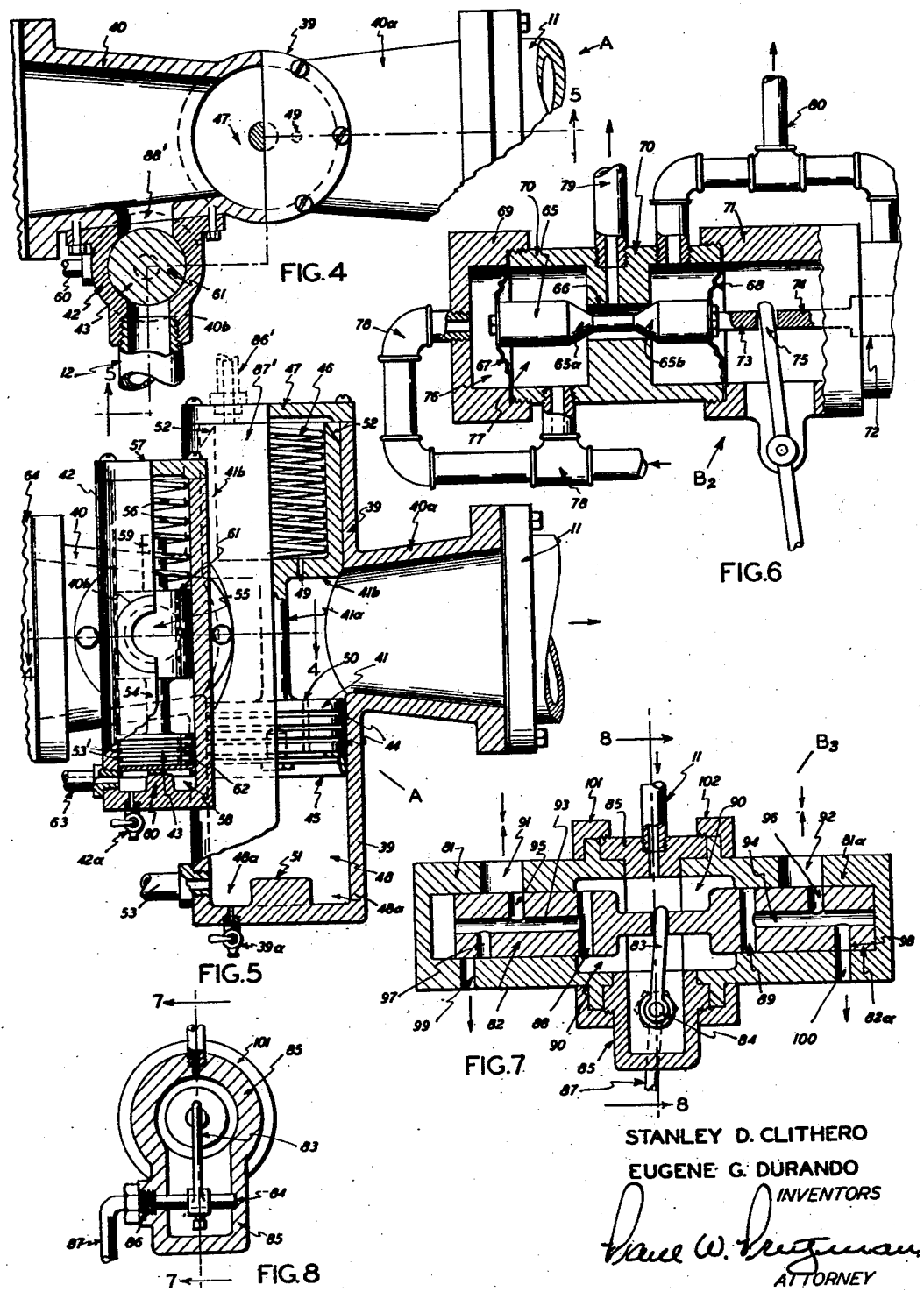

Patented Nov. 27, 1934

1,982,045

UNITED STATES PATENT OFFICE 1,982,045

GAS TANK PRESSURE REGULATOR

Stanley D. Clithero, Long Beach, and Eugene G. Durando, Los Angeles, Calif.

Application November 2, 1931, Serial No. 572,618

3 Claims. (Cl. 220—85)

This invention relates to a pressure regulator and more particularly to that class of pressure regulator used on a gas-tight oil storage tank to control the pressure of the vapor in the space above the liquid in the tank.

Automatically controlled pressure valves are well known to those versed in the art, but this invention embodies improvements which have for their object to provide a valve within which preferably two pistons are controlled by a special form pilot valve provided also with two hollow pistons which are in turn actuated by a gasometer or flexible diaphragm which is subject to actuation by variable pressures within a tank.

This invention contemplates also the use of a valve within which a single piston is controlled by a special pilot valve provided with two hollow pistons which are actuated by a gasometer. Another object is to provide a pressure regulator which is supersensitive to very slight variations of pressure which range substantially below one-half inch of water.

A further object is to provide a pressure regulator which is positive, accurate, and highly efficient in operation, simple in construction, and inexpensive to manufacture.

Other objects will appear as this description proceeds.

To prevent oil from losing any of its valuable lighter fractions when stored for long periods of time the storage tanks are built gas-tight and some mechanical means, such as the usual pressure regulator valve in conjunction with a gasometer, is used to equalize pressure variations due to various causes such as temperature changes, addition of oil to or removal of oil from the tank. The actual variable pressure due to temperature change alone is too slight to sensitively operate the mechanism of valves controlling vacuum and pressure lines even though it is multiplied by permitting it to operate against a diaphragm or gasometer of large area in conjunction with a system of levers.

The valve type pressure regulator used in present practice not only offers restriction to the flow of a large volume of gas, but is also thrown out of balance by high velocities of gas.

In this invention the inflow and outflow of large volumes of gas is permitted by large, straight-line openings through the pressure and vacuum valves. The pilot valve being remote from the flow of gas is therefore uneffected by the high velocities and remains in perfect balance under all conditions.

Other points of advantage will become evident hereinafter.

In general this invention in its practical aspects is arranged to operate in connection with either a single storage tank or a multiple of tanks in series for the purpose of maintaining the vapor therein at a constant pressure when the temperature varies or the liquid is introduced in or drawn out of the tank. The mechanism includes a gasometer or breather valve of the usual type connected directly to the tank. Very slight variations of pressure in the tank are forceful enough to cause said gasometer to sensitively actuate a pilot valve, which valve accordingly in turn directs the force of dry gas under pressure from the main high pressure line into another larger piston type pressure valve, thus actuating it in such manner as to allow gas to enter or escape from the tank and thereby control the pressure in said tank.

With the above and other objects in view, this invention consists in the new and useful provision, formation, construction, combination, and interrelation of parts, members, and features, all as hereinafter disclosed, shown in the drawings and finally pointed out in claims.

In the drawings

Fig. 4 is a partial sectional view of a pressure valve taken along the line 4—4 of Fig. 5.

Fig. 5 is a sectional elevation of same taken along 5—5 of Fig. 4.

Fig. 6 is a fragmentary sectional view similar to Fig. 2 but showing a variant thereof.

Fig. 7 is a sectional view taken along the line 7—7 of Fig. 8, showing a further variant of Fig. 2.

Fig. 8 is a sectional view taken along the line 8—8 of Fig. 7.

Corresponding parts in all figures are designated by the same reference characters.

Figure 1:
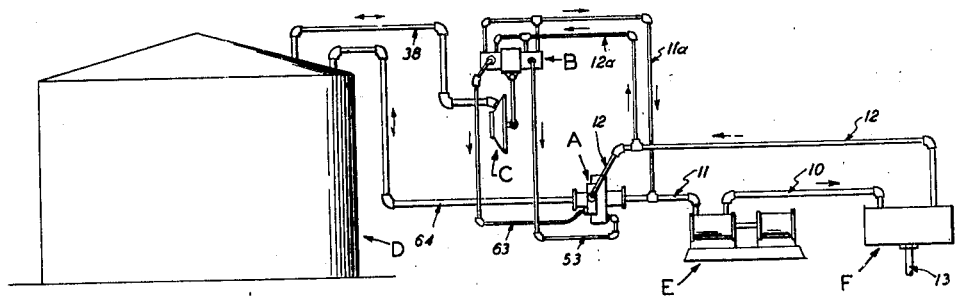
Fig. 1 is a diagrammatical illustration of a pressure regulating system embodying the essential features of this invention.

Referring particularly to the drawings: A in Fig. 1 represents a pressure control valve as embodied in this invention, B represents a pilot valve of either form of this invention, and C represents a common gasometer or breather valve, D is an oil storage tank, E conventionally represents a compressor and is indicative only of any suitable means of maintaining a high pressure in a pipe line 10 and a vacuum or low pressure in an exhaust line 11, F merely indicates a recovery plant for removing the liquid substance from the vapor in the line 10 emitting a dry gas into line 12 under high pressure, line 12 may be any dry gas pressure supply line through which gas is furnished for both supplying the tank and for supplying power to operate the pressure valve A. Line 13 is an outlet for the recovered liquid from the aforesaid plant.

Figure 2:
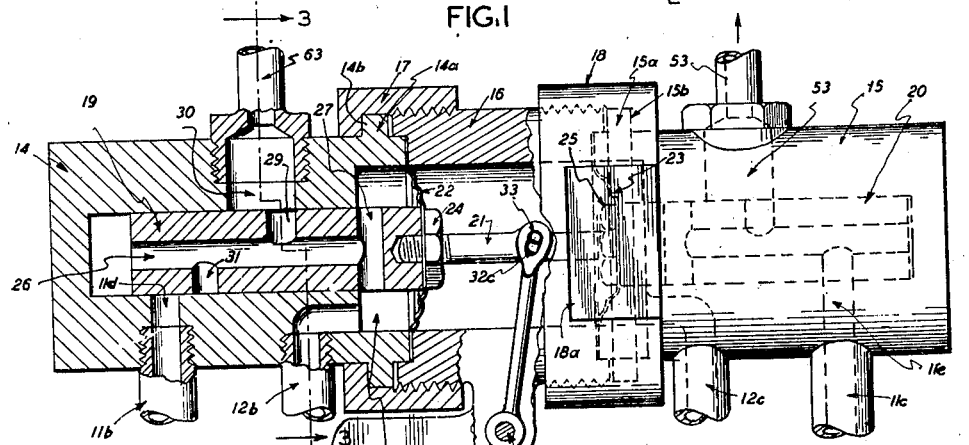
Fig. 2 is a sectional view of a pilot valve partly in elevation and partly broken away showing a gasometer in conjunction therewith.
Figure 3:
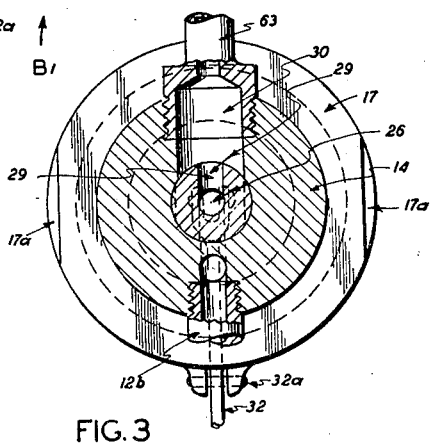
Fig. 3 is a cross sectional view taken along 3—3 of Fig. 2.

A preferable form of pilot valve B shown in Fig. 2 and Fig. 3 comprises a pair of cylinders 14 and 15 which have annularly outwardly projecting members 14a and 15a respectively disposed near their innermost ends forming shoulders 14b and 15b respectively and which are spaced apart axially by a housing member 16 which is counterbored at each end to receive the ends of said cylinders and also threaded at each end to engage with threaded collars 17 and 18. The flat surfaces 17a and 18a are provided in said collars for a wrench. Said collars are shouldered to coact with aforesaid shoulders 14b and 15b and thereby hold said cylinders fixedly in position. Two pistons or plungers 19 and 20 of special form which work axially in aforesaid cylinders are adjustably connected to each other by a threaded rod 21 and are fastened to the center of two flexible diaphragms 22 and 23 by nuts 24 and 25 respectively, which also serve as locking nuts to hold said plungers apart and in position on said rod. Both said plungers and both said diaphragms are likewise spaced apart substantially the same distance as said plungers, the said diaphragms being held in the joint between said member 16 and said cylinders 14 and 15; so that an equal area of each diaphragm is exposed to the gas and atmospheric pressures.

The plungers 19 and 20 are identical in all respects. Considering now plunger 19, a passage 26 extends axially from its outer end to a plurality of radial ports 27 near its inner end which register with annular chamber 28 when the plunger is moved to the right and is cut off when said plunger is moved to the left. Located along the same axial element of the plunger as ports 27 is another port 29, which registers with opening 30 in cylinder 14 for all positions of the said plunger 19. Located on another angular element from said port 29 and spaced apart therefrom is a port 31 which registers with opening 11d in cylinder 14 when the plunger is in the extreme left position and is cut off when said plunger is in extreme right position. The lever arm 32 is slidably and pivotally connected at its one end to aforementioned rod 21 by a pin 33 through same and pivoted to member 16 at 32a and also pivotally connected to an arm 34 at 32b which is fastened to and actuated by the diaphragm 35 of gasometer C. Gasometer C is fixedly mounted on an extension arm 36 of member 16. Diaphragm chamber 37 of said gasometer is directly connected with the vapor space in the tank D by pipe 38. The openings 11d and 11e are connected by branch pipes 11b and 11c respectively to vacuum line 11a in Fig. 1.

A preferable type of control valve A in Fig. 4 and Fig. 5 consists of a special form of piston valve embodying a comparatively large cylinder 39 having pipes 40 and 40a at each side thereof with flanged connections and integral therewith and extending at right angular relationship thereto in opposite directions; so that the axis of said pipes are coincident and intersect the axis of said cylinder near its midpoint. The inside diameters of said pipes preferably increase outwardly as shown. This is not essential but merely indicates that valve may be made adaptable to be connected directly to any size piping.

A piston member 41, of special form, works axially within said cylinder for the purpose of opening and closing the direct passageway through pipes 40 and 40a. Another comparatively smaller cylinder 42, similar to said cylinder 39 in general construction, is bolted to aforementioned pipe 40 and has an auxiliary pipe 40b extending from the side thereof. A piston member 43 of similar form to first named piston works axially within said cylinder 42 for the purpose of opening and closing the direct passageway through pipe 40b and pipe 40.

On the lower end of piston 41 is formed a plurality of grooved annular depressions 44 spaced apart along its length, a flexible cup member 45 attached to the bottom end thereof bears against the cylinder walls to act as a further seal for the escape of gas around the said piston. A cylindrical neck of reduced diameter 41a separates the skirt 41b from the lower end of piston 41 by a distance equal to the smallest diameter of pipe 40. A compression spring 46 housed within the said hollow skirt coacts with cylinder head 47 to force the said piston 41 downward against the pressure of gas in the chamber 48. The bottom portion of skirt 41b contains a small by-pass vent hole 49. The lower end of piston 41 also contains a small by-pass vent hole 50; so that escape of gas therethrough has a throttling action when a sudden pressure is admitted to chamber 48. A lug 51 is provided on the bottom end of cylinder 39 to restrict motion of piston 41 and form an annular oil reservoir 48a for the lubrication of cup 45 and lower part of cylinder 39. Skirt 41b has a beveled edge 52 which forms an oil reservoir for lubrication of upper part of cylinder 39. The chamber 48 is connected to passage 53a in valve B by a pipe 53.

Essentially the piston 43 may be exactly like piston 41 except for size, but a slightly different form is here set forth as being a desirable variant. Said piston 43 has formed on its lower end a plurality of grooved annular depressions 53' spaced apart along its length. A cylindrical neck of reduced diameter 54 separates said grooved portion from the upper solid cylindrical portion 55 by a distance equal to the smallest diameter of pipe 40b. A compression spring 56 retained in the space above the portion 55 in the cylinder 42 coacts with cylinder head 57 to force the said piston 43 downward against the pressure of gas in chamber 58. A boss 59 projects from the top of said cylinder portion 55 to restrict upward motion of said piston 43. A boss 60 is formed in lower end of cylinder 42 to restrict downward motion of piston 43. By-pass vent holes 61 and 62 are provided in said piston members 55 and 43. The chamber 58 is directly connected to passage 30 in the pilot valve B by a pipe 63.

Flanged pipe 40 is connected to storage tank D by pipe 64 and pipe 40a is connected to vacuum line 11. Auxiliary pipe 40b is connected to dry gas pressure line 12. Drain valves 39a and 42a are disposed in the lower ends of cylinders 39 and 42 respectively for draining off condensate or surplus cylinder lubricant.

*Operation*

Operation of the pressure regulating system is as follows: If the temperature of the oil and vapor is declining or oil is being removed from the airtight tank D a consequent lowering of pressure in the vapor space above the oil is transmitted to diaphragm chamber 37 thus causing arm 34 to move toward the left. The opposite end of lever 32 is thereby moved toward the right forcing plunger 19 with it in such manner that the port 27 registers with chamber 28 and port 31 is cut off from passage 11d. The passage of dry gas is thereby directed from pressure line 12 through passage 26 in plunger 20, through port 29 and opening 30, thence through pipe line 63 to chamber 58 in small cylinder of control valve A where the pressure builds up until it overcomes the combined force of the compression spring 56 and the weight of piston 43 and lifts the said piston thereby opening the valve in pipe 40b, the valve in pipe 40 and 40a being closed off by piston 41. This operation allows a stream of high pressure dry gas from the compressor or pressure line 12 to be directed into the line 64 through pipe 40 thence to the tank D where it serves to increase the pressure until the return of the pilot and control valves to their original position occurs, the supply of dry gas being thus cut off. Thus the system is returned to its original state of quiescence. In this condition of balance the lever arm 32 of the pilot valve must be in the midposition; so that ports 27 are closed off and the port 31 registers with opening 11d, and so that the excess gas left in the valve may escape through the scavenge line branch 11b to vacuum line 11.

When the temperature is raised or oil is being added to the tank, the breather valve or gasometer is actuated in the opposite direction (to the right) and the same action as before occurs in the cylinder 15 whereby the piston 41 in control valve A is opened and allows the excess pressure in the tank to be relieved directly through pipe 40a into a vacuum line 11, while the valve in cylinder 42 is closed. When the pressure in said tank D becomes sufficiently reduced, the escape of vapor is automatically cut off by piston 41 and the system returns to its original state of quiescence as before. The said escaped vapor is exhausted into a vacuum line, as described, or may pass through a compressor E thence to a recovery plant F where the vapor is removed by condensation and the dry gas allowed to pass into the high pressure pipe line 12 for re-use.

The pressure from line 12 is at all times pressing on the diaphragms 22 and 23 in opposite directions and against equally effected areas thereof in such manner that there is no actuation of the pilot valve plungers 19 and 20 from this cause.

The slot 32c in lever arm 32 has a slight clearance in its width for pin 33; so that any very slight breathing action of the gasometer is not transmitted to the plunger rod 21. Plunger rod 21 is threaded to receive the plungers 19 and 20 capable of adjustment; so that the diaphragms and plungers may be brought into proper alignment with the ports and passages.

The by-pass vent holes 50 and 62 in pistons 41 and 43 respectively are provided to allow gas to leak out of chambers 48 and 58 less rapidly than it is admitted, thereby causing a throttling action to motion of said pistons for preventing vibration thereof when sudden pressure is admitted to said chambers. The by-pass vent holes 49 and 61 are provided in pistons 41 and 43 to allow the pressure of gas above and below the piston to equalize.

Two contemplated variant forms of pilot valve are shown in Fig. 6, Fig. 7, and Fig. 8.

In Fig. 6 is shown a portion of a pilot valve in which the operation is substantially the same as that previously described herein except with this difference of form: the plunger 65 is formed of a solid cylinder having its middle portion of reduced diameter, the connection portions 65a and 65b forming frustrums of circular cones which seat on the edge of the cylindrical passage 66, making a double valve. Each end of said plunger is tightly fastened to diaphragms 67 and 68 which are held in position at the joint between cylinder cap 69 and the main body of cylinder 70 and the joint between said body and member 71 respectively. Plunger 65 is not connected to a like plunger 72 on the opposite side of the valve as was the plunger in the pilot valve shown in Fig. 2, but is entirely independent therefrom. The projecting members 73 and 74 coact slidably with an actuating lever 75 which is attached to some pressure valve or gasometer C such as shown in Fig. 2. When said lever 75 is in midposition, there is clearance enough between members 73, 74, and 75; so that slight breathing action of the gasometer does not affect the plunger valves. The space 76 in cap 69 is connected to space 77 around the plunger 65 by a pipe 78 which is also connected with any suitable pressure supply line such as 12 in Fig. 1. Chamber 66 is connected to a pressure valve such as 43 of the valve in Fig. 5 by a pipe 79. Pipe 80 is a scavange line connected to a vacuum line such as 11 in Fig. 1.

The operation of said last described type of pilot valve is substantially the same as that of the type shown in Fig. 2, the point of greatest advantage being that the two plungers may be balanced independently of each other.

In Figs. 7 and 8 are shown a further variant of pilot valve which operates in substantially the same manner as aforesaid valves but with a variation which will become evident hereinafter. The diaphragms are eliminated and the pressure of dry gas is allowed to enter a chamber between the two plungers. The actuating arm of the gasometer is offset on a crank arm which passes through a packing gland in the valve housing to prevent the escape of gas.

Substantially Figs. 7 and 8 represent a pilot valve comprised of a double cylinder 81 and 81a, a double plunger 82 and 82a working axially therein and actuated by a lever arm 83 pivoted on a crank 84 journaled in housing 85 and having a packing gland 86 surrounding said crank where it projects through said housing. Said crank is provided with an arm 87 which may be fastened to any gasometer such as shown in Fig. 2. The plungers are provided with ports 88—89 which register with a gas chamber 90 at alternate positions of the plunger to allow passage of dry gas from pipe 12 (Fig. 1) to openings 91—92 through ports 93—94 and 95—96 respectively, thence to the cylinders of a pressure valve such as shown in Fig. 5. Ports 97—98 register with openings 99—100 respectively, which lead to a vacuum line 11 in Fig. 1.

The threaded rings 101 and 102 hold cylinders 81 and 81a in position against a shouldered position of housing 85.

This last mentioned valve may be used not only similarly to the first two types herein described, but is particularly adaptable for use in the following described manner also; in this case the pilot valve B would cause the control valve A to operate by vacuum instead of pressure and vacuum. The passage 53 in valve A is closed and a passage 86' is substituted in the top of cylinder 39 and a connection is made to passage 92 in pilot valve. When pressure in the tank D is increased, the piston 82a is forced to the left, the port 89 registers with the chamber 90, and gas is allowed to pass from the space 87' in valve A through pipe 86' to passage 92 in valve B thence through ports 96 and 94 to said port 89 and thence into the vacuum line 11, while port 98 is closed off. This decreasing of pressure in space 87' above the piston 41 in valve A causes said piston to rise and open the valve to allow escape of pressure from the tank D through pipe 40a until the reverse action in the gasometer takes place and causes piston 82a to move to the right closing port 89 and opening port 100; so that the vacuum left in cylinder 39 will be replaced by air through the said vent port 100 and the force of gravity and the spring 46 will cause piston 41 to return to its closed position. The other plunger 82 in valve B3 will coact in the same manner with cylinder 42 in valve A to cause relief of vacuum in the tank D. It is understood that the cylinder 42 may be removed from the pipe 40 and the passage 88' capped; so that the valve could be used as a single control to regulate pressure only, in which case one of the two pistons in valve B3 would be cut out by plugging passages 91 and 99.

We claim as our invention:

1. Means for controlling the pressure in a tank communicating through separate channels with a gas pressure main and a vacuum main, said means comprising: a pressure control valve interposed in each said channel, each said valve comprising a cylinder, a piston moving therein and an opening in said piston so placed as to open and close said channel on alternate endwise movement of said piston; a pilot valve having a reciprocable element, each end of said element being ported to afford communication between said pressure and vacuum mains, alternately, and one said control valve cylinder; a pressure responsive means communicating with the interior of said tank and adapted to produce a reciprocating movement in response to changes in pressure within said tank, and mechanical linkage whereby said reciprocating movement produces a corresponding movement of said reciprocable pilot valve element.

2. Means for controlling the pressure in a tank communicating through a pressure channel with a gas pressure main and through a vacuum channel with a vacuum main, said means comprising: a pressure control valve interposed in said vacuum channel, said valve comprising a cylinder, a piston moving therein and an opening in said piston so placed as to open and close said channel on alternate endwise movements of said piston; a pilot valve through which said cylinder communicates with both said mains; a pressure responsive means communicating with the interior of said tank and adapted to produce a reciprocating movement in response to changes in pressure within said tank, and mechanical linkage whereby said pilot valve is caused to alternately place said pressure main and said vacuum main in communication with said cylinder in response to said reciprocating movement.

3. Means for controlling the pressure in a tank communicating through a channel with a conduit maintained at other than atmospheric pressure, said means comprising: a pressure control valve interposed in said channel, said valve comprising a cylinder, a piston moving therein, resilient means urging said piston in one direction and an opening in said piston so placed as to open and close said channel on alternate endwise movements of said piston; means of fluid communication between said conduit and one end of said cylinder; a pilot valve interposed in said fluid communication means; a pressure responsive means communicating with the interior of said tank and adapted to produce a reciprocating movement in response to changes in pressure within said tank, and mechanical linkage whereby said pilot valve is opened and closed by said reciprocating movement.

STANLEY D. CLITHERO.
EUGENE G. DURANDO.